(12) United States Patent
Deng

(10) Patent No.: US 8,351,892 B2
(45) Date of Patent: Jan. 8, 2013

(54) NETWORK DETECTION DEVICE POWER CONSERVATION

(75) Inventor: Guanghua Deng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 551 days.

(21) Appl. No.: 12/694,410

(22) Filed: Jan. 27, 2010

(65) Prior Publication Data

US 2011/0183726 A1 Jul. 28, 2011

Related U.S. Application Data

(60) Provisional application No. 61/181,000, filed on May 26, 2009.

(51) Int. Cl.
*H04B 1/16* (2006.01)
(52) U.S. Cl. .................. 455/343.5; 455/343.3; 455/574; 370/311
(58) Field of Classification Search ............... 455/343.5, 455/574, 343.1, 343.2, 127.1, 127.5; 370/311, 370/350
See application file for complete search history.

(56) References Cited

U.S. PATENT DOCUMENTS

| | | | | |
|---|---|---|---|---|
| 5,708,820 A | * | 1/1998 | Park et al. ...................... | 713/323 |
| 5,758,278 A | * | 5/1998 | Lansdowne ................ | 455/343.4 |
| 5,799,256 A | * | 8/1998 | Pombo et al. ................... | 455/574 |
| 6,333,939 B1 | * | 12/2001 | Butler et al. ................... | 370/503 |
| 6,453,181 B1 | * | 9/2002 | Challa et al. ................... | 455/574 |
| 6,577,608 B1 | * | 6/2003 | Moon et al. ................... | 370/311 |
| 6,614,299 B2 | * | 9/2003 | Hirvilampi et al. ........ | 330/124 R |
| 6,985,773 B2 | * | 1/2006 | Von Arx et al. ................. | 607/32 |
| 7,047,050 B1 | | 5/2006 | Khawand et al. | |
| 7,372,818 B2 | * | 5/2008 | Fraser et al. ................... | 370/252 |
| 7,620,409 B2 | * | 11/2009 | Budampati et al. ........... | 455/502 |
| 7,787,437 B2 | * | 8/2010 | Sakoda ........................ | 370/350 |
| 7,847,726 B2 | * | 12/2010 | Jia et al. ................... | 342/357.31 |
| 8,130,788 B2 | * | 3/2012 | Tsao ............................. | 370/465 |
| 8,134,942 B2 | * | 3/2012 | Messinger et al. ............ | 370/311 |
| 8,223,744 B2 | * | 7/2012 | Goldberg et al. ............. | 370/350 |
| 2003/0017837 A1 | * | 1/2003 | Kalliojarvi ..................... | 455/522 |
| 2003/0085760 A1 | * | 5/2003 | Hirvilampi et al. ....... | 330/124 R |
| 2003/0119530 A1 | | 6/2003 | Rankin | |

(Continued)

OTHER PUBLICATIONS

International Search Report and Written Opinion—PCT/US2010/036197, International Search Authority—European Patent Office—Oct. 21, 2010.

*Primary Examiner* — Minh D Dao (74) *Attorney, Agent, or Firm* — Andrew Newton; Nicholas A. Cole (57) ABSTRACT

Methods and devices for determining intervals between mobile device network searches use measured signal power as lookup criteria to obtain a predefined "sleep" duration from a sleep duration data structure. When a network connection is lost the mobile device may compare received signal power to criteria in a data table to determine an appropriate sleep duration during which the receiver is de-energized to conserve battery power. The sleep durations vs. signal power may be predefined to provide performance as good as other sleep duration determining algorithms while providing flexibility for matching network coverage characteristics. An appropriate sleep duration data table for use may be determined based upon device location or user inputs. At the end of a sleep interval, received signal power may be compared to a threshold to determine whether the receiver should return to sleep mode or attempt a network connection.

37 Claims, 5 Drawing Sheets

U.S. PATENT DOCUMENTS

| | | |
|---|---|---|
| 2004/0204184 A1 | 10/2004 | Lin |
| 2004/0229659 A1 | 11/2004 | Boos et al. |
| 2006/0281436 A1* | 12/2006 | Kim et al. ................. 455/343.2 |
| 2008/0020751 A1* | 1/2008 | Li et al. ......................... 455/424 |
| 2009/0131074 A1 | 5/2009 | Minier |
| 2009/0170510 A1* | 7/2009 | Kim .............................. 455/434 |
| 2010/0070786 A1* | 3/2010 | Qing et al. .................... 713/321 |
| 2010/0087701 A1* | 4/2010 | Berka et al. ..................... 600/27 |
| 2011/0051645 A1* | 3/2011 | Hong et al. .................... 370/311 |
| 2011/0063094 A1* | 3/2011 | Meiertoberens et al. .... 340/12.5 |
| 2011/0086651 A1* | 4/2011 | Li et al. .......................... 455/501 |
| 2011/0128995 A1* | 6/2011 | Sanji et al. ..................... 375/145 |
| 2011/0211513 A1* | 9/2011 | Coleri Eregen et al. ...... 370/311 |
| 2011/0222449 A1* | 9/2011 | Goldberg et al. ............. 370/311 |
| 2011/0270490 A1* | 11/2011 | Katou et al. ..................... 701/36 |
| 2012/0177361 A1* | 7/2012 | Hirano et al. ..................... 398/1 |

* cited by examiner

| Signal Power | Sleep Duration |
|---|---|
| -30dbm to -80dbm | 2.56 seconds |
| --80dbm to -95dbm | 3.5 seconds |
| -95dbm to -105dbm | 10 minutes |

NETWORK DETECTION DEVICE POWER CONSERVATION

RELATED APPLICATIONS

This application claims the benefit of priority to U.S. Provisional Patent Application Ser. No. 61/181,000 entitled "Network Detection Device Power Conservation," filed on May 26, 2009, the entire contents of which are hereby incorporated by reference.

TECHNICAL FIELD

The present invention relates generally to the operation of mobile wireless networks, and more particularly to methods for detecting wireless networks to conserve device battery power.

BACKGROUND

In the field of wireless communications, conserving battery power is a universal design concern. An important operating condition during which the conservation of battery power is particularly important occurs when wireless communication devices are out of network coverage range. Every attempt to reestablish connection with a network consumes battery power, thus continuously attempting to reconnect to a network when network coverage is unavailable can quickly deplete a battery. To conserve battery power, current wireless communication devices will repeat a network connection attempt at either uniform search intervals or at variable search intervals. In the uniform search interval scheme, a device will "wake up" at fixed time intervals, whether or not the devices are within range of network coverage. In variable interval schemes, the wireless communication device may sleep for an initial short interval before attempting a network connection. If the device fails to acquire a network signal, the device may return to the sleep mode for a longer time interval before performing another network connection attempt. The sleep period depends upon the number of failed network connection attempts. Thus, current methods all require attempting and failing to establish a network connection before determining the next sleep interval and returning to a sleep mode.

SUMMARY

The various embodiments provide methods and devices for conserving battery power of a mobile device in a wireless communication system by performing a table lookup on a data table of predefined sleep duration values using received signal power as a lookup criterion to obtain a sleep duration when a network connection cannot be established. The mobile device may then de-energize its transceiver to enter a "sleep mode" for the obtained sleep duration. In an embodiment, the mobile device may re-energize the transceiver and measure received signal power when the sleep duration expires and, based upon the received power level, re-perform the table lookup operation and re-enter the sleep mode when the measured received signal power is less than a minimum threshold, which is a predefined configurable value, or attempt to establish a network connection when the measured received signal power equals or exceeds the minimum threshold. In a further embodiment, the mobile device may obtain position information, such as from an internal Global Positioning System receiver or communication system based station ID, and, based upon the obtained position information, select one of a plurality of predefined sleep duration data tables to use in the table lookup process. In a further embodiment, the mobile device may solicit and receive user input for use in selecting one of a plurality of predefined sleep duration data tables for use in the table lookup process.

The various embodiments may be implemented as methods performed within a mobile device, as a mobile device configured to perform the embodiment methods, and as a tangible storage medium including processor-executable instructions which cause a processor of a mobile device to perform the embodiment methods.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "mobile device" and "receiver device" refer to any one or all of cellular telephones, personal data assistants (PDAs), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, interactive gaming devices, portable television devices (e.g., FLO TV® devices), and similar personal electronic devices which may include a programmable processor, memory, and a wireless communication receiver or transceiver circuit.

In order to be portable, mobile devices must be designed to operate for extended periods of time on battery power. Repeated attempts to connect to a wireless network when the mobile device is out of range of any base stations will drain battery power and shorten the operating time of a mobile device. To conserve battery power, mobile devices are typically configured to attempt to connect to a network or search for networks according to a search interval scheme. In such search interval schemes, the mobile device enters a "sleep mode" by powering down (de-energizing) the transceiver in between network search attempts for a predefined "sleep duration." The various embodiments provide methods and devices for conserving a mobile device's battery power by establishing predefined sleep durations between network searches according to the received signal power level. The predefined sleep durations may be defined and stored in the memory of the device in a data structure, such as one or more data tables, that may be accessed in a table lookup algorithm based upon the received signal power level. The data table may specify different sleep durations in between each search based on the signal power measured by the mobile device.

A sleep duration between network searches based on the measured received signal level can conserve battery power compared to other known schemes for scheduling network searches. The predetermined sleep durations stored in the data structure may correlate a low signal power with a long sleep duration and a relatively high signal power with a short sleep duration. Thus, if a mobile device is in an area of poor network coverage, it will measure a low signal power, which may be correlated to a long sleep duration, and therefore the mobile device may sleep longer between network searches instead of repeatedly searching for a network which would deplete battery power.

The various embodiments provide a solution for saving battery power when mobile devices are in or out of desired network coverage. A data table or other form of data structure containing predefined sleep durations is accessed using received signal power as the search criteria to determine the device sleep duration before the next search is completed for a desired network signal, e.g., a paging indicator channel in WCDMA. A table lookup operation is performed using a received signal power level. The signal power level is a value available in all CDMA mobile devices. When the mobile device is in a good network coverage area, the signal power will be relatively high, and the average duration that a network signal will be unavailable will generally be short. Hence the wakeup timer can be set to a relatively short sleep duration, such as, e.g., 2.56 seconds, as is typical in WCDMA. However, when the mobile device is in a poor network coverage area, such as near or just beyond a coverage area boundary, the measured signal power will be low, and the duration that a network connection will be unavailable may be longer. Hence the timer can be set to a relatively long duration, such as, e.g., 5 minutes. If the received signal power remains low, the next timer interval may be even larger, such as, e.g., 15 minutes.

In various embodiments the sleep duration data table may be a fixed table, so a network search algorithm does not actually need to carry out the network search action and fail to establish a connection in order to determine the next sleep duration. Rather, the network search algorithm uses the sleep duration data table to determine the next wake up timer setting based upon the received signal power, thereby saving the battery power that would be consumed by the process that checks for coverage conditions. This power level-based sleep duration data table may be optimized using drive test data to select sleep durations that would match or exceed current network search algorithms in particular coverage conditions. In other words, network providers can develop sleep duration data tables based upon the characteristics of their own networks. Once the sleep duration data table is created, the searcher algorithm can be greatly simplified.

Figure 1:
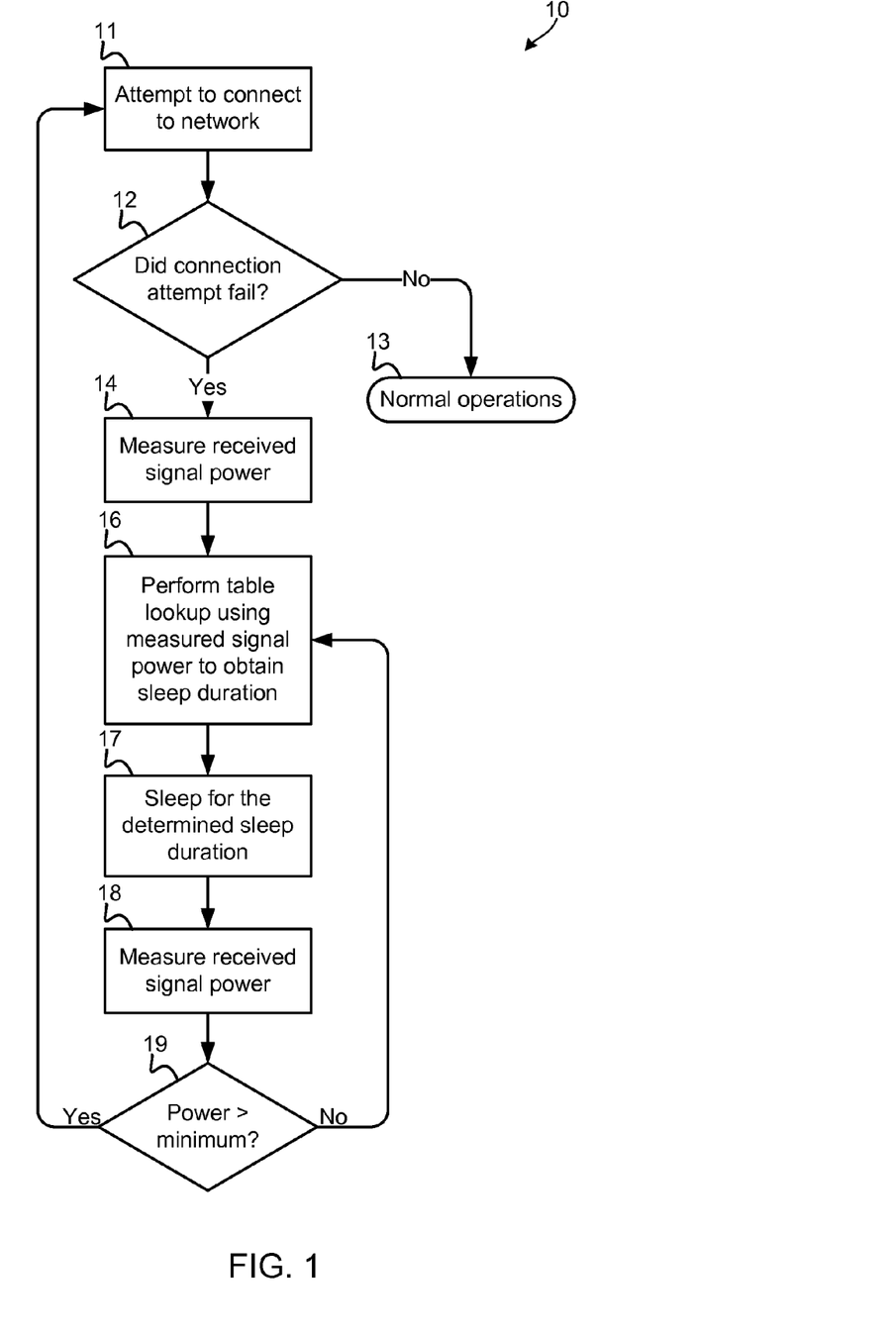
FIG. 1 is a process flow diagram of an embodiment method for defining an interval for conducting a network search.

An exemplary embodiment method 10 for determining a network search interval is illustrated in FIG. 1. As part of the normal operation, a mobile device may attempt to connect to a cellular network, step 11. As part of this process, the mobile device may determine whether a connection was established or that the connection attempt failed, determination step 12. If a network connection was successfully established (i.e., determination step 12="No"), the mobile device may continue with normal cellular communication operations, step 13. If the mobile device failed to establish a connection to a cellular network (i.e., determination step 12="Yes"), the mobile device may measure the received signal power in step 14. This measurement of received signal power may already have been conducted and available as part of the network acquisition attempt, step 11, or as a variable in memory available as part of the normal receiver functionality as typical in a CDMA mobile device. Thus, the measurement of the signal power in step 14 need not be performed after a connection attempt has failed, or may involve accessing a memory register containing the measured received signal power. Following a failed connection attempt, a processor of the mobile device may perform a table lookup operation using the measured signal power to obtain the mobile device's next sleep duration from a sleep duration data table in step 16. This table lookup operation may involve comparing the received signal power level to a predefined maximum, minimum, or power range criteria included in a data field of the various data records in a predefined sleep durations data table in order to identify one data record for which the predefined criterion is best satisfied by the measured received signal power. The processor may access a predefined sleep duration value stored in a data field of the identified data record. The mobile device processor may use the obtained sleep duration value to set a countdown timer and power down the transceiver (i.e., enter a sleep mode) for this duration, step 17.

During the sleep duration, the mobile device processor may be performing other applications on the mobile device as well as decrementing and monitoring the sleep duration countdown timer. When the countdown timer expires, the mobile device may energize the transceiver and obtain a new measure of the received signal power, step 18. The processor may compare the received signal power to a minimum threshold in determination step 19 in order to determine whether there is sufficient power to warrant conducting another network access attempt. If the received signal power exceeds the minimum (i.e., determination step 19="Yes"), the processor may return to step 11 to attempt connection to a cellular network. However, if the received signal power is less than the minimum (i.e., determination step 19="No"), the processor may return to step 16 and repeat the table lookup operation to obtain the next sleep duration based upon the measured received signal power and proceed to repeat the processes described above.

Figure 2:
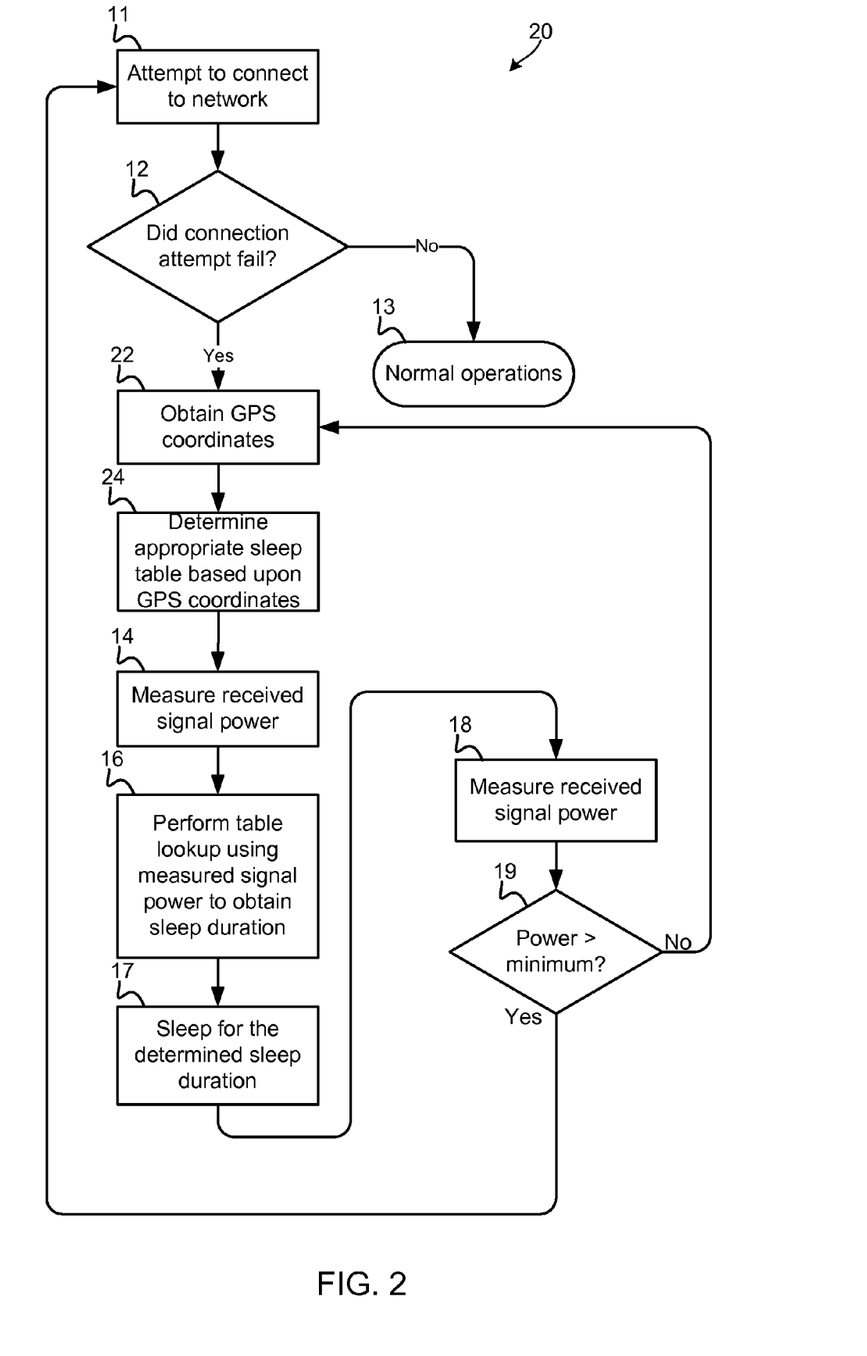
FIG. 2 is a process flow diagram of an embodiment method for defining an interval for conducting a network search relying upon GPS coordinates.

A second exemplary embodiment method 20 for determining a network search interval is illustrated in FIG. 2. In this embodiment method, a mobile device may attempt to connect to a network, step 11, determine if the connection attempt was successful, determination step 12, and if successful (i.e., determination step 12="No") proceed with normal cellular communication operations, step 13, as described above with reference to FIG. 1. If the connection fails (i.e., determination step 12="Yes"), the mobile device may obtain its location from a Global Positioning System (GPS) receiver in step 22. Step 22 does not have to occur after a failed network connection attempt, as the mobile device's location may have already been determined prior to the failed network connection attempt. Thus, step 22 may involve accessing a memory register containing the location information. Alternatively, in step 22 the mobile device may obtain its location information from the cellular network with which it was most recently connected, such as in the form of a base station identifier or location information provided by the network.

Using the determined location information, the mobile device may select an appropriate sleep duration data table from a plurality of predefined sleep duration data tables in step 24. The selection of an appropriate sleep table may occur anytime after the location is determined. To identify the appropriate one of the plurality of predefined sleep duration data tables, the processor in step 24 may perform a table lookup operation using a location-table data table which correlates location information to the appropriate sleep duration data table identifier (e.g., data table file name). A variety of different lookup criteria may be used in such a location-table, including, for example, geographic coordinate ranges (e.g., latitude and/or longitude ranges), geographic area names (e.g., "Canada," "California," or "Atlantic Ocean"), and relative distances (e.g., distance from a closest network base station or coverage area). In this manner, service providers can define sleep duration data tables that are customizable to particular regions or locations in order to provide mobile device performance as good as or better than conventional sleep duration algorithms within their own and affiliates' service areas.

The mobile device may measure or obtain the received signal power level in step 14 and use that information to perform a table lookup using the sleep duration data table selected in step 24 to obtain an appropriate sleep duration in step 16, as described above with reference to FIG. 1. The mobile device may enter a sleep mode for the obtained sleep duration by setting a countdown timer and de-energizing the receiver in step 17. When the determined sleep duration is completed, the mobile device may reenergize and obtain a new measurement of received signal power, step 18, and determine if the signal power level is sufficient to conduct an attempted connection to the network, determination step 19, as described above with reference to FIG. 1. If there is sufficient power to warrant searching for a network (i.e., determination step 19="Yes"), the mobile device may return to step 11 and attempt to connect to a cellular network. If not (i.e., determination step 19="No"), the mobile device may return to step 22 (or, alternatively, step 16) to repeat the process described above.

Figure 3:
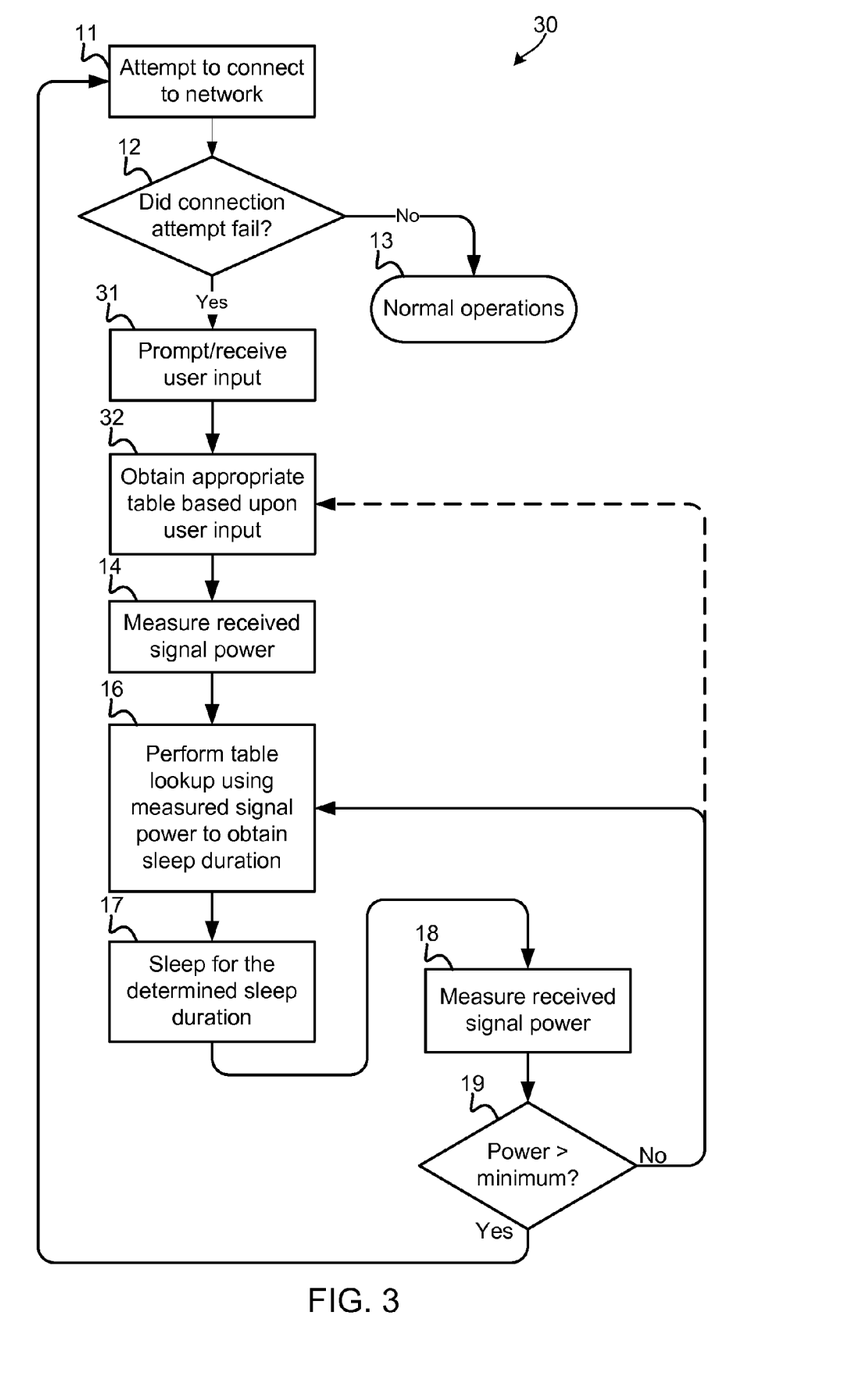
FIG. 3 is a process flow diagram of an embodiment method for defining an interval for conducting a network search relying upon user input.

A third exemplary embodiment method 30 for determining a network search interval is illustrated in FIG. 3. As in embodiment methods 10 and 20, a mobile device may attempt to connect to a network, step 11, determine if the attempt failed, determination step 12, and if the attempt did not fail (i.e., determination step 12="No"), proceed with normal cellular communication operations, step 13, as described above with reference to FIGS. 1 and 2. If the attempt to connect to a network failed (i.e., determination step 12="Yes"), the mobile device may prompt the user (e.g., in a question presented on the display) to input an answer or information that may be useful in selecting the appropriate one of a plurality of sleep duration data tables, step 31. For example, in step 31, the mobile device may pose the question which asks whether the user is located inside a building where network coverage may not be available. Thus, if the user responds to the prompt by indicating that the mobile device is located within a building where network coverage is unavailable, the mobile device may select a sleep duration data table that is appropriate to such circumstances. As another example, in step 31, the mobile device may ask the user to enter a time or interval when the user expects to be in a location where a network connection can be obtained. Thus, if the user responds to the prompt by inputting a particular time of day when network coverage is expected (e.g., a time when the user expects to leave a building or come within range of a cellular coverage area), the mobile device may use this information to set a sleep duration and select an appropriate sleep duration data table to use in such circumstances. A variety of different questions may be predefined by a service provider to obtain information from users that can enable the mobile device to provide reliable service and conserve battery power.

Based on one or a series of inputs received from the user in step 31, the mobile device may select an appropriate sleep duration data table from a plurality of predetermined sleep duration data tables in step 32. The selection of the appropriate sleep table may occur anytime after the user input. Further, the user inputs may be received at any time, including as part of a user setting in a configuration option or as part of a set up menu. In this manner, users may be given the option of selecting the network search versus battery conservation performance they prefer. Thus, if a user knows that the mobile device will be outside a network coverage area (e.g., if the user is working in a shielded building, is going fishing in the ocean, or is off to an afternoon of spelunking), the user can configure the phone to use an appropriate sleep duration data table.

Following the failed connection attempt, the mobile device may measure or obtain the received signal power level in step 14 and use that information to perform a table lookup using the sleep duration data table selected in step 32 to obtain an appropriate sleep duration in step 16, as described above with reference to FIG. 1. The mobile device may enter a sleep mode for the obtained sleep duration by setting a countdown timer and de-energizing the receiver in step 17. When the determined sleep duration is completed, the mobile device may re-energize and obtain a new measurement of received signal power, step 18, and determine if the signal power level is sufficient to conduct an attempted connection to the network, determination step 19, as described above with reference to FIG. 1. If there is sufficient power (i.e., determination step 19="Yes"), the mobile device may return to step 11 and attempt to connect. If not (i.e., determination step 19="No"), the mobile device may return to step 16 to obtain another sleep duration, or alternatively, to step 32 to obtain further user input, and repeat the process described above.

Figure 4:
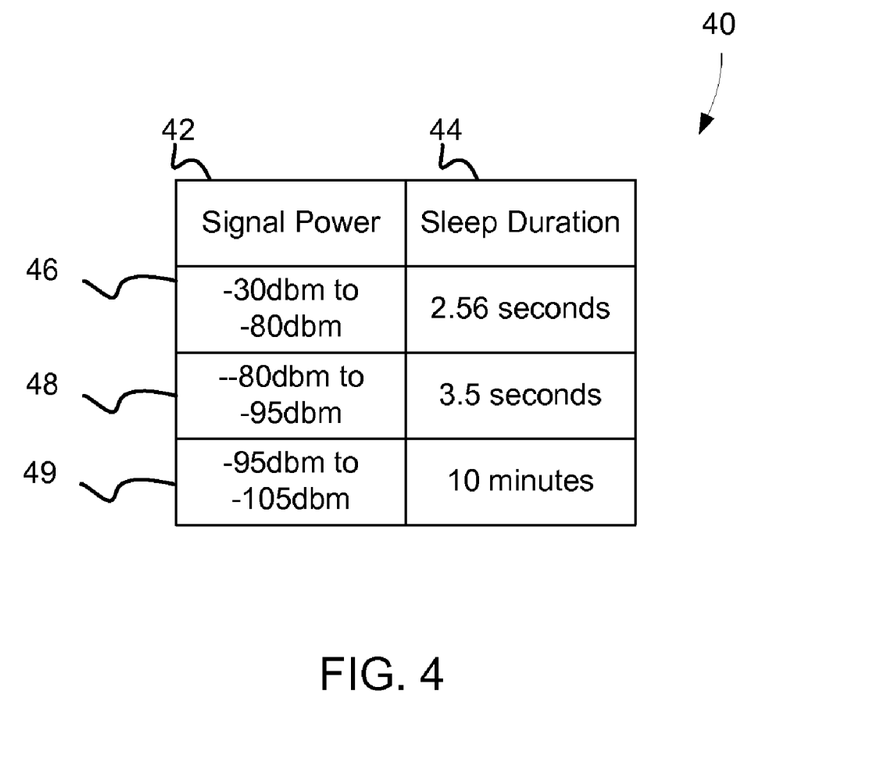
FIG. 4 is a data structure diagram relating signal power to sleep duration.

The predefined search intervals may be stored in a variety of different data structures, such as one or a series of sleep duration data tables as illustrated in FIG. 4. The table lookup operation employed by the various embodiments to determine the next sleep duration can be as simple as referring to a two column table correlating signal power values with sleep durations, such as example table 40. The example data table 40 includes a plurality of data records (shown as rows) 46, 48, and 49, each made up of at least two data fields 42, 44. The data table 40 may contain a data field 42 for storing a signal power level and a data field 44 for storing a sleep duration value. For example, in column 42 of row 46 the power range is listed as −30 dbm to −80 dbm, with the corresponding sleep duration set at 2.56 seconds. In row 48 the signal power range (column 42) is listed as −80 dbm to −95 dbm, with the corresponding sleep duration (column 44) set at 3.5 seconds. In row 49 the signal power range (column 42) is listed as −95 dbm to −105 dbm, with the corresponding sleep duration (column 44) set at 10 minutes.

While FIG. 4 illustrates a table format data structure, other forms of data structures may be implemented in the various embodiments, including an XML data structure. Also, instead of implementing the sleep duration criteria and values as a data structure, they may be implemented as a set of rules or as a set of conditional operations (e.g., "if-then" statements) within executable code.

By using a table lookup operation based on a received signal power level, the mobile device is not required to attempt to connect to a network and fail in order to determine the presence of network coverage. Every attempt to connect to a network consumes battery power. Therefore, if the mobile device can use the predefined sleep duration values stored in a data table to avoid connection attempts that are unlikely to succeed, it can save the battery power associated with failed network searches. The mobile device can avoid these attempts by using the sleep duration data table which correlates long sleep durations with low signal strength characteristics of bad coverage (e.g., poor reception) areas. Instead of repeatedly performing a sequence of search, fail, and retry after a fixed interval, the mobile device may sleep for longer periods and conserve power whenever a low signal power is used in the table lookup to obtain a long sleep duration.

The operation can be made more flexible with additional memory use. The mobile device can store previous signal power levels in a memory register to recall later for comparison to new signal power levels. For example, the embodiment may be such that if low signal power levels are obtained twice in succession, the mobile device can recall the previous low power signal level, compare it with the new signal level to find they are both relatively low, and double the next sleep duration.

Under conditions in which the mobile device uses the sleep duration data table to determine the sleep duration, the determination of the mobile device's present network coverage is concealed by the table lookup process. The implementation of the table lookup embodiments is simple and flexible for covering various scenarios and different network coverage situations. For example, two or more consecutive signal power levels may be used to determine the next sleep duration and, thus, avoid more connection attempts that are unlikely to succeed. Further, the embodiments can resolve the choice between using a uniform or non-uniform search cycle in an out of service (OOS) condition. By relying upon the sleep duration table lookup, the mobile device does not need to make an out of service determination.

While the foregoing embodiments are described with reference to cellular telephone mobile devices, the claims are not limited to such devices. This is because the embodiment methods and circuits may also be implemented in any wireless communication or wireless receiver device that establishes communications with or receives signals from localized wireless transmitters. For example, the various embodiments may be implemented to conserve battery in GPS receivers, mobile TV broadcast receivers, and wireless wide-area network (WWAN) transceivers by placing the receiver or transceiver in low-power configurations for sleep durations determined based on signal strength when the device is out of range, shielded, or otherwise prevented from receiving wireless communications.

Figure 5:
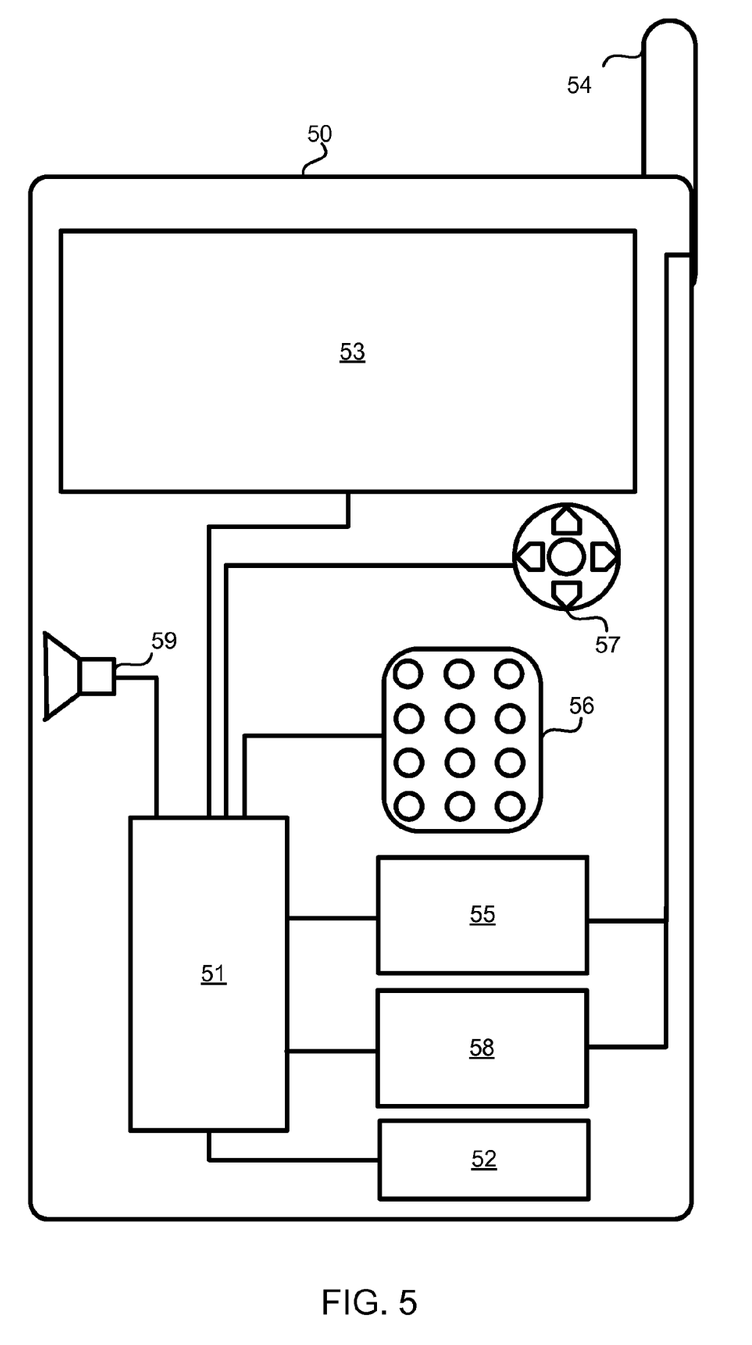
FIG. 5 is a component block diagram of a mobile device suitable for use in an embodiment.

Typical mobile devices 50 suitable for use with the various embodiments will have in common the components illustrated in FIG. 5. For example, an exemplary wireless receiver 50 may include a processor 51 coupled to internal memory 52, a display 53, and to a speaker 59. Additionally, the mobile device 50 may have an antenna 54 for sending and receiving electromagnetic radiation that is connected to a wireless data link and/or cellular telephone transceiver 55 coupled to the processor 51. In some implementations, the transceiver 55 and portions of the processor 51 and memory 52 used for cellular telephone communications are collectively referred to as the air interface since it provides a data interface via a wireless data link. The transceiver circuit 55 can include both a wireless receiver circuit and a wireless transmitter circuit. In some embodiments, the mobile device 50 may be a wireless receiver device, in which case the mobile device 50 may also or alternatively include a receiver circuit 58 coupled to the processor 51. Wireless mobile device 50 typically also includes a key pad 56 or miniature keyboard and menu selection buttons or rocker switches 57 for receiving user inputs.

The processor 51 may be any programmable microprocessor, microcomputer or multiple processor chip or chips that can be configured by software instructions (applications) to perform a variety of functions, including the functions of the various embodiments described herein. In some mobile devices, multiple processors 51 may be provided, such as one processor dedicated to wireless communication functions and one processor dedicated to running other applications. Typically, software applications may be stored in the internal memory 52 before they are accessed and loaded into the processor 51. In some mobile devices, the processor 51 may include internal memory sufficient to store the application software instructions. In many wireless receivers 50, the internal memory 52 may be a volatile or nonvolatile memory, such as flash memory, or a mixture of both. For the purposes of this description, a general reference to memory refers to all memory accessible by the processor 51, including internal memory 52, removable memory plugged into the wireless receiver 50, and memory within the processor 51 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in hardware, the functionality may be implemented within circuitry of a wireless signal processing circuit that may be suitable for use in a wireless receiver/transceiver or mobile device. Such a wireless signal processing circuit may include circuits for accomplishing the signal measuring and calculating steps described in the various embodiments. If implemented in software, the functions may be stored on or transmitted over as one or more instructions or code on a processor-readable medium. The steps of a method or algorithm disclosed herein may be embodied in a processor-executable software module which may reside on a processor-readable storage medium. A storage media may be any available tangible storage media that may be accessed by a processor or computer. By way of example, and not limitation, such processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a processor or computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of processor-readable media. Additionally, the operations of a method or algorithm may reside as one or any combination or set of codes and/or instructions on a machine readable storage medium and/or processor-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for conserving battery power of a mobile device in a wireless communication system, comprising:
  performing a table lookup on a data table of sleep duration values using received signal power to obtain a sleep duration when a network connection cannot be established; and
  de-energizing a receiver circuit within the mobile device for the obtained sleep duration.

2. The method of claim 1, further comprising:
  reenergizing the receiver circuit and measuring received signal power when the sleep duration expires;
  re-performing the table lookup and de-energizing the receiver circuit for the obtained sleep duration when the measured received signal power is less than a threshold; and
  attempting to establish a network connection when the measured received signal power equals or exceeds the threshold.

3. The method of claim 1, further comprising:
  obtaining mobile device position information; and
  selecting one of a plurality of sleep duration data tables based upon the obtained position information,
  wherein performing a table lookup on a data table is accomplished using the selected one of the plurality of sleep duration data tables.

4. The method of claim 3, wherein the position information is obtained from a Global Positioning System receiver within the mobile device.

5. The method of claim 3, wherein the position information is obtained from an identifier of a base station within the wireless communication system with which the mobile device was most recently in communication.

6. The method of claim 1, further comprising:
  selecting one of a plurality of sleep duration data tables based upon a user input,
  wherein performing a table lookup on a data table is accomplished using the selected one of the plurality of sleep duration data tables.

7. The method of claim 6, further comprising:
  prompting a user to provide an input useful in selecting one of the plurality of sleep duration data tables; and
  receiving the user input.

8. A mobile device, comprising:
  a processor;
  a memory coupled to the processor; and
  a receiver circuit coupled to the processor and configured to receive signals from a wireless communication network,
  wherein the processor is configured with processor-executable instructions to perform operations comprising:
    performing a table lookup on a data table of sleep duration values using received signal power to obtain a sleep duration when a network connection cannot be established; and
    de-energizing the receiver circuit for the obtained sleep duration.

9. The mobile device of claim 8, wherein the processor is configured with processor-executable instructions to perform operations comprising further comprising:
  reenergizing the transceiver and measuring received signal power when the sleep duration expires;
  re-performing the table lookup and de-energizing the transceiver for the obtained sleep duration when the measured received signal power is less than a threshold; and
  attempting to establish a network connection when the measured received signal power equals or exceeds the threshold.

10. The mobile device of claim 8, wherein the processor is configured with processor-executable instructions to perform operations further comprising:
  obtaining mobile device position information; and
  selecting one of a plurality of sleep duration data tables based upon the obtained position information,
  wherein performing a table lookup on a data table is accomplished using the selected one of the plurality of sleep duration data tables.

11. The mobile device of claim 10, further comprising a Global Positioning System receiver, wherein the processor is configured with processor-executable instructions such that the position information is obtained from the Global Positioning System receiver.

12. The mobile device of claim 10, wherein the processor is configured with processor-executable instructions such that the position information is obtained from an identifier of a base station within the wireless communication system with which the mobile device was most recently in communication.

13. The mobile device of claim 8, wherein the processor is configured with processor-executable instructions to perform operations further comprising:
   selecting one of a plurality of sleep duration data tables based upon a user input,
   wherein performing a table lookup on a data table is accomplished using the selected one of the plurality of sleep duration data tables.

14. The mobile device of claim 13, wherein the processor is configured with processor-executable instructions to perform operations further comprising:
   prompting a user to provide an input useful in selecting one of the plurality of sleep duration data tables; and
   receiving the user input.

15. The mobile device of claim 8, wherein the mobile device is a cellular telephone and the mobile device further comprises a transceiver circuit, wherein the receiver circuit and transceiver circuit comprise a transceiver circuit.

16. The mobile device of claim 8, wherein the mobile device is a mobile TV receiver and the receiver circuit is configured to receive mobile TV broadcast signals.

17. The mobile device of claim 8, wherein the receiver circuit is a component of a wireless wide-area network (WWAN) transceiver configured to establish a communication link with a wireless wide-area network.

18. A mobile device, comprising:
   means for receiving wireless signals from a wireless communication network;
   means for performing a table lookup on a data table of sleep duration values using received signal power to obtain a sleep duration when a network connection cannot be established; and
   means for de-energizing the means for receiving wireless signals from a wireless communication network for the obtained sleep duration.

19. The mobile device of claim 18, further comprising:
   means for reenergizing the means for receiving wireless signals and measuring received signal power when the sleep duration expires;
   means for re-performing the table lookup to obtain a sleep duration and de-energizing the means for receiving wireless signals for the obtained sleep duration when the measured received signal power is less than a threshold; and
   means for attempting to establish a network connection when the measured received signal power equals or exceeds the threshold.

20. The mobile device of claim 18, further comprising:
   means for obtaining mobile device position information; and
   means for selecting one of a plurality of sleep duration data tables based upon the obtained position information,
   wherein means for performing a table lookup on a data table comprises means for performing a table lookup using the selected one of the plurality of sleep duration data tables.

21. The mobile device of claim 20, wherein means for obtaining mobile device position information comprises a Global Positioning System receiver.

22. The mobile device of claim 20, wherein means for obtaining mobile device position information comprises means for obtaining mobile device position information from an identifier of a base station within the wireless communication system with which the mobile device was most recently in communication.

23. The mobile device of claim 18, further comprising:
   means for selecting one of a plurality of sleep duration data tables based upon a user input,
   wherein means for performing a table lookup on a data table is accomplished using the selected one of the plurality of sleep duration data tables.

24. The method of claim 23, further comprising:
   means for prompting a user to provide an input useful in selecting one of the plurality of sleep duration data tables; and
   means for receiving the user input.

25. The mobile device of claim 18, wherein the mobile device is a cellular telephone and the mobile device further comprises means for establishing a communication link with a cellular telephone network.

26. The mobile device of claim 18, wherein the mobile device is a mobile TV receiver and the means for receiving wireless signals from a wireless communication network comprises means for receiving mobile TV broadcast signals.

27. The mobile device of claim 18, wherein means for receiving wireless signals from a wireless communication network comprises means for establishing a communication link with a wireless wide-area network (WWAN).

28. A processor-readable storage medium having stored thereon processor-executable instructions configured to cause a processor to perform operations comprising:
   performing a table lookup on a data table of sleep duration values using received signal power to obtain a sleep duration when a network connection cannot be established; and
   de-energizing a receiver circuit for the obtained sleep duration.

29. The processor-readable storage medium of claim 28, wherein the stored processor-executable instructions are configured to cause a processor to perform operations comprising further comprising:
   reenergizing the transceiver and measuring received signal power when the sleep duration expires;
   re-performing the table lookup and de-energizing the transceiver for the obtained sleep duration when the measured received signal power is less than a threshold; and
   attempting to establish a network connection when the measured received signal power equals or exceeds the threshold.

30. The processor-readable storage medium of claim 28, wherein the stored processor-executable instructions are configured to cause a processor to perform operations comprising further comprising:
   obtaining mobile device position information; and
   selecting one of a plurality of sleep duration data tables based upon the obtained position information,
   wherein performing a table lookup on a data table is accomplished using the selected one of the plurality of sleep duration data tables.

31. The processor-readable storage medium of claim 30, wherein the stored processor-executable instructions are configured to cause a processor to receive the position information from a Global Positioning System receiver.

32. The processor-readable storage medium of claim 30, wherein the stored processor-executable instructions are configured to cause a processor to perform operations comprising obtaining the position information from an identifier of a base station within a wireless communication system.

33. The processor-readable storage medium of claim 28, wherein the stored processor-executable instructions are configured to cause a processor to perform operations further comprising:

selecting one of a plurality of sleep duration data tables based upon a user input, wherein performing a table lookup on a data table is accomplished using the selected one of the plurality of sleep duration data tables.

34. The processor-readable storage medium of claim 33, wherein the stored processor-executable instructions are configured to cause a processor to perform operations further comprising:

prompting a user to provide an input useful in selecting one of the plurality of sleep duration data tables; and receiving the user input.

35. The processor-readable storage medium of claim 28, wherein the processor-readable storage medium is configured to be readable by a processor of a cellular telephone.

36. The processor-readable storage medium of claim 28, wherein the processor-readable storage medium is configured to be readable by a processor of a mobile TV receiver.

37. The processor-readable storage medium of claim 28, wherein the processor-readable storage medium is configured to be readable by a processor of a wireless wide-area network (WWAN) transceiver.

* * * * *